April 6, 1926.  A. JOHNSON  1,579,943
AUTOMOBILE
Filed Sept. 21, 1925   5 Sheets-Sheet 1
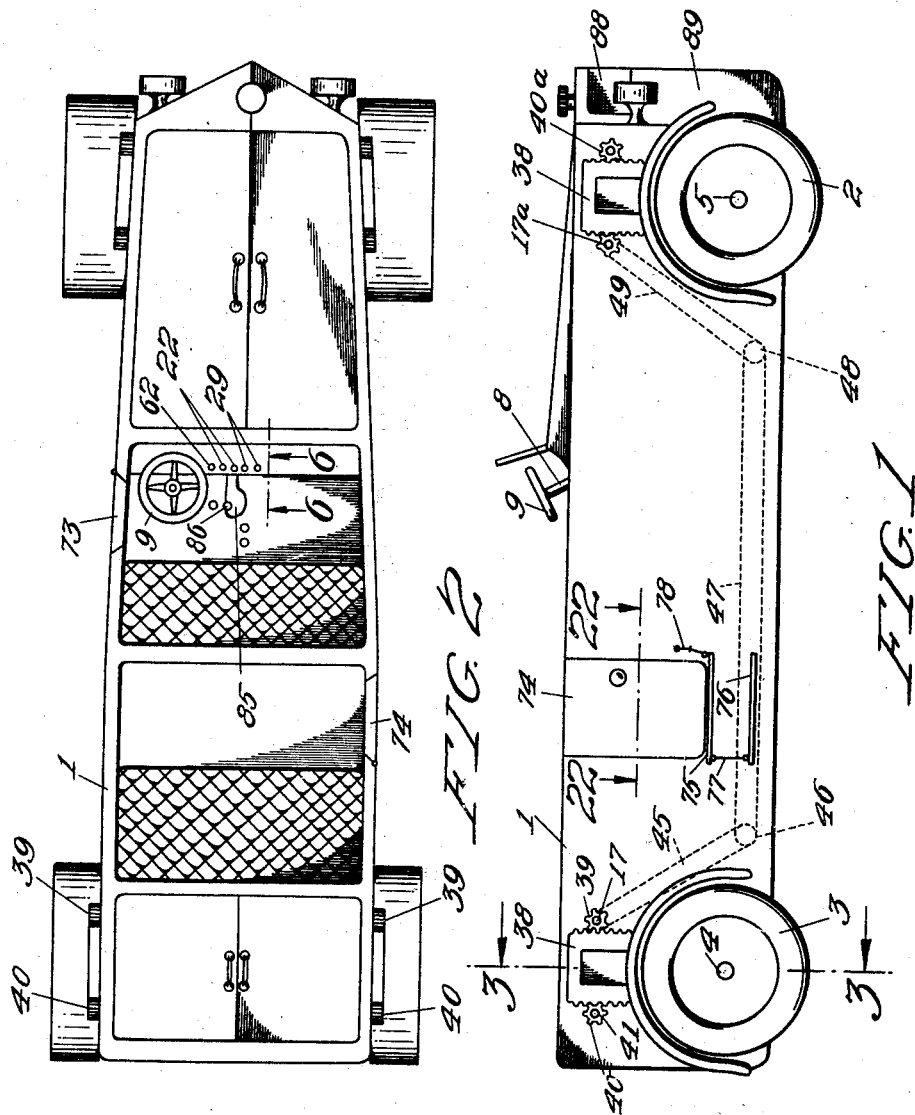
WITNESS:
Gust. Hjelm
INVENTOR:
A. Johnson
BY H.J. Sanders
ATTORNEY April 6, 1926.
A. JOHNSON
AUTOMOBILE
Filed Sept. 21, 1925
1,579,943
5 Sheets-Sheet 2
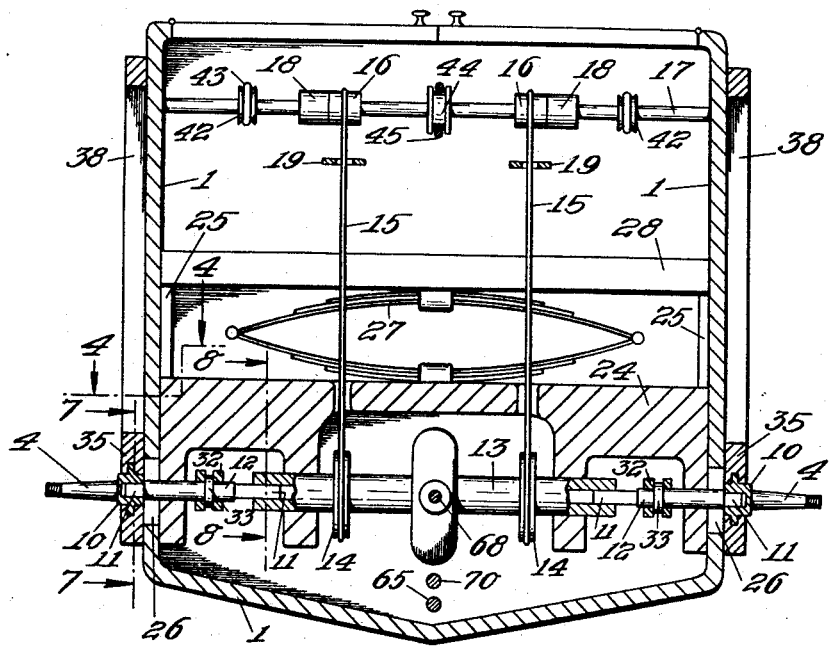

April 6, 1926.

A. JOHNSON

AUTOMOBILE

Filed Sept. 21, 1925   5 Sheets-Sheet 3

1,579,943

WITNESS:
Gust. Hjelm

INVENTOR:
A. Johnson
BY
H.J. Sanders
ATTORNEY

April 6, 1926.

A. JOHNSON

AUTOMOBILE

Filed Sept. 21, 1925   5 Sheets-Sheet 4

1,579,943

WITNESS:
Gust. Hjelm

INVENTOR:
A. Johnson
BY
H. J. Sanders
ATTORNEY

April 6, 1926. 1,579,943
A. JOHNSON
AUTOMOBILE
Filed Sept. 21, 1925 5 Sheets-Sheet 5

WITNESS:
Gust. Hjelm

INVENTOR:
A. Johnson
BY H.J. Sanders
ATTORNEY.

Patented Apr. 6, 1926.

1,579,943

UNITED STATES PATENT OFFICE.

ARTHUR JOHNSON, OF DETROIT, MICHIGAN.

AUTOMOBILE.

Application filed September 21, 1925. Serial No. 57,688.

*To all whom it may concern:*

Be it known that I, ARTHUR JOHNSON, a citizen of the United States, residing at Detroit, in the county of Wayne and State of Michigan, have invented certain new and useful Improvements in Automobiles, of which the following is a specification.

This invention relates to improvements in automobiles and more particularly to an automobile adapted to travel either upon land or water. With the foregoing and other objects in view the invention consists in the combination and arrangement of parts to be hereinafter fully described, pointed out in the appended claims and illustrated in the accompanying drawings which form a part of this application and in which—

Fig. 1 is a side view of the machine.

Fig. 2 is a top plan view of the same.

Fig. 3 is a vertical cross section taken on the line 3—3 of Fig. 1, enlarged.

Fig. 4 is an enlarged fragmentary sectional view taken on the line 4—4 of Fig. 3.

Fig. 5 is a section taken on line 5—5 of Fig. 3.

Fig. 6 is a section on line 6—6 of Fig. 2.

Figs. 7 and 8 are sections taken, respectively, on lines 7—7 and 8—8 of Fig. 3.

Fig. 9 is a detail of the lift pinions employed and their connections.

Figure 10:
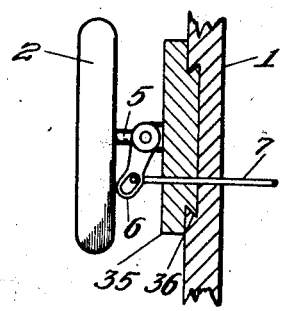

Fig. 10 is a sectional detail view showing the means for securing the front wheels to the vehicle.

Figure 11:
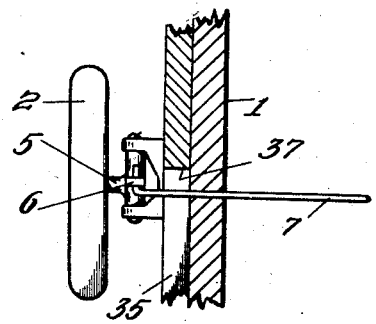

Fig. 11 is a front view of Fig. 10.

Figure 12:
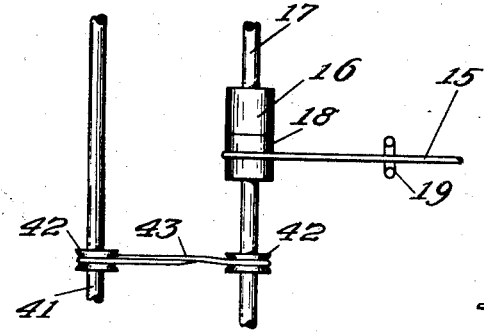

Fig. 12 is a fragmentary view of Fig. 3.

Figure 13:
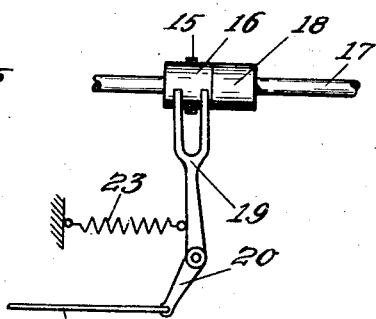

Fig. 13 is a fragmentary front view of Fig. 12.

Figure 14:
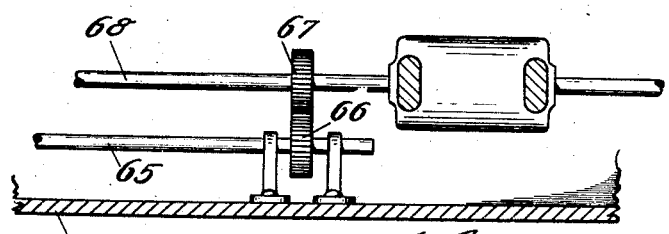

Fig. 14 is a fragmentary sectional view illustrating the propeller shaft and drive means therefor.

Figure 15:
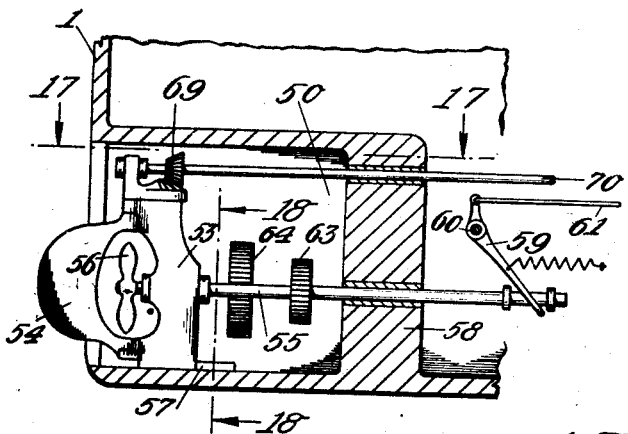

Fig. 15 is a fragmentary sectional view illustrating the propeller housing, the propeller and control mechanism therefor.

Figure 16:
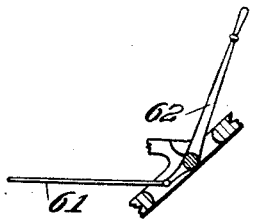

Fig. 16 is a detail of the hand lever for control of the propeller.

Figure 17:
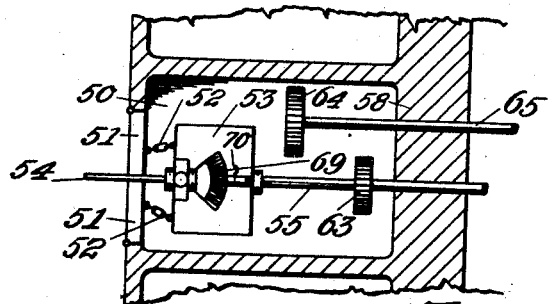

Fig. 17 is a horizontal sectional view taken on line 17—17 of Fig. 15.

Figure 18:
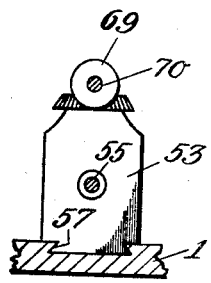

Fig. 18 is a vertical sectional view taken on line 18—18 of Fig. 15.

Figure 19:
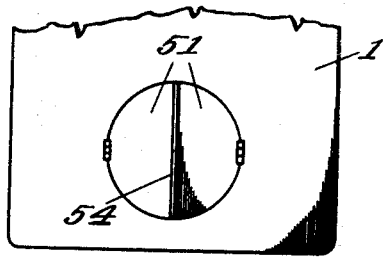

Fig. 19 is a detail view of the rear end of the vehicle showing the doors in the propeller housing.

Figure 20:
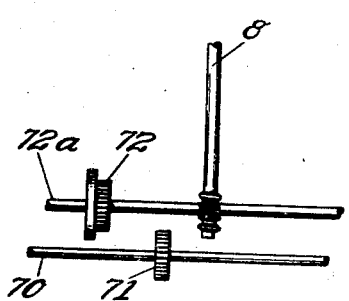

Fig. 20 is a detail view of the steering mechanism.

Figure 21:
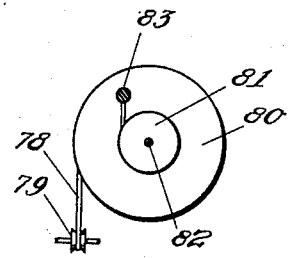
Figure 22:
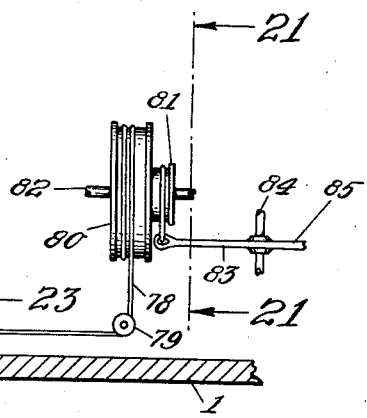

Fig. 21 is a detail view taken on line 21—21 of Fig. 22.

Fig. 22 is a section taken on line 22—22 of Fig 1.

Figure 23:
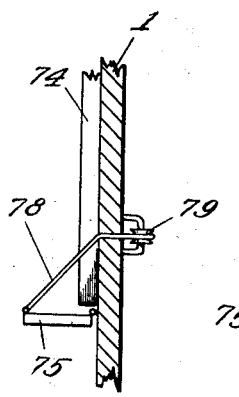

Fig. 23 is a sectional view on line 23—23 of Fig. 22.

Figure 24:
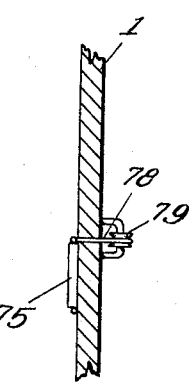

Fig. 24 is a view of Fig. 23 in an altered or closed position.

Figure 25:
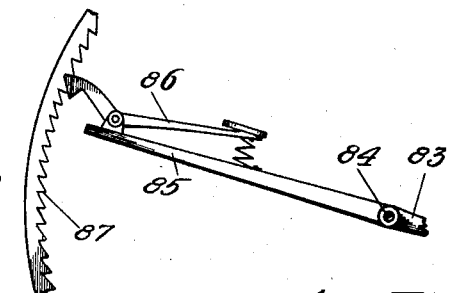

Fig. 25 is a detail view of the control mechanism for the side doors.

Figure 26:
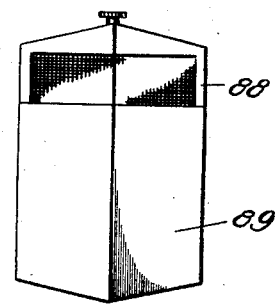

Fig. 26 is a fragmentary front view of the machine showing the radiator and protecting doors therefor.

Like reference characters denote corresponding parts throughout the several views.

The automobile comprises the body 1 supported upon the front wheels 2 and rear wheels 3, the said wheels being each mounted upon stub axles 4, the front axles being provided with the usual extensions 5 formed with slotted ears 6 that receive the bent ends of the connecting rod 7; said front wheels being operatively connected to the steering post 8 of the wheel 9. Each axle 4 is formed at its inner end with a socket 10 having a square opening therein to releasably receive one end 11, which is square in cross section, of a transversely movable connecting axle 12, the inner ends of both of said axles also being square in cross section and operatively connected to the vehicle drive shaft 13.

Fast upon the shaft 13 are the spaced pulleys 14, 14 each of which is connected by a belt 15 with one of the loose pulleys 16, 16 arranged upon the transverse shaft 17 journaled in the sides of the body 1. Pulleys 18, 18 fast upon the shaft 17 abut the pulleys 16 for engagement by the said belts 15 when it is desired to drive the shaft 17 from the shaft 13. The belts 15 are shifted from the loose pulleys to the fast pulleys by means of the fork levers 19 fulcrumed in the vehicle floor and connected by links 20 to the wire rods 21 that are connected to the hand levers 22 arranged in the front compartment of the vehicle. Springs 23 connect the fork levers 19 and the body of the vehicle and yieldingly retain said levers in a predetermined position whereby the belts 15 are yieldingly engaged with the loose pulleys 16.

A bridge 24 extends transversely of the body 1 at the rear end thereof and is seated in vertical grooves 25 therein, said bridge being mounted upon the drive shaft 13 and the axles 12, the latter extending through slots 26 in the walls of the body, said bridge at its top being connected by the large elliptical spring 27 to the cross beam 28 which forms a floor for the rear end of the body. Ordinarily the vibration caused by the travel of the vehicle over roads on land will be absorbed by the spring 27 at the rear end of the body, the bridge 24 and axles 12 and shaft 13 transmitting the vibration from the wheels. When the vehicle is to travel in water the axles 12 are retracted or drawn in toward the shaft 13 by means of hand levers 29 arranged in the front compartment and connected by the rods 30 to the bell-crank-levers 31 in one end of each of which an elongated slot 32 is formed that is in engagement with a flange 33 formed upon an axle 12, a spring 34 connecting each bell-crank-lever yieldingly retains it in a predetermined position whereby the axle 12 is releasably retained in engagement with the socket 10 in the stub axles 4. When the axles 12 are thus retracted they are free of the wheels.

All four wheels of the vehicle are operatively mounted in blocks 35 which slidably seat in vertical grooves 36 in the body sides 1, the blocks 35 at the front end of the machine being formed with vertical slots 37 to permit their movement relative to the connecting rod 7 which does not move vertically but which is constantly in alignment with the slots in the ears 6 for engagement or disengagement therewith.

Each block 35 is firmly held by and movable with a sliding rack, four racks being provided, 38 which is slidably secured to the exterior of the body of the vehicle, the two rear racks 38 being directly opposite each other upon opposite sides of the body 1 and the two front racks similarly arranged. The rear racks are in mesh with pinions 39 fast upon the ends of the shaft 17 and with pinions 40 fast upon the ends of an auxiliary shaft 41 spaced away from and parallel to the shaft 17 and operatively connected thereto by pulleys 42 and connecting crossed belts 43. When the drive shaft is operatively connected to the shafts 17 and 41 the racks 38 and blocks 35 with wheels 2 and 3 are raised relative to the body to permit the vehicle to take to the water. Reversing the motion of shaft 13 will reverse the shafts 17 and 41 and lower the racks, blocks and wheels when desired.

The shaft 17 is provided with another pulley 44 connected by belt 45 to a similar pulley on a transmission shaft 46 having its ends journaled in the sides of the body, said shaft 46 being connected by a belt 47 to a pulley on another transmission shaft 48 which is connected by belt 49 to shafts 17$^a$ and 41$^a$ which correspond in every respect to the shafts 17 and 41 at the rear end, said shafts 17$^a$, 41$^a$ driving the front racks by means of gears at their ends as shown in Fig. 1.

In the rear end of the vehicle the propeller compartment 50 is located and provided with the swinging doors 51 which are connected by chains 52 to the block 53 to which the rudder 54 is pivotally secured and in which the shaft 55 is journaled that carries the propeller 56, said block 53 being slidably seated in a groove 57 formed in the bottom of the vehicle, said shaft 55 extending through the wall 58 of the propeller housing and being connected to the dog 59 fulcrumed upon a shaft 60 and connected by rod 61 to the control lever 62 arranged in the front compartment. By means of the lever 62 the propeller and rudder may be moved into and out of the propeller housing opening or closing the doors 51 in their movement. A gear 63 fast upon the shaft 55 is adapted to mesh with a gear 64 when the propeller is disposed outside the housing, said gear 64 being fast upon the end of the transmission 65 that extends longitudinally of the vehicle, another gear 66 of shaft 65 being in mesh with a gear 67 fast upon the main transmission shaft 68. When the shaft 55 is moved into operative association with the shaft 65 the propeller is driven, in its operative position, by the main transmission shaft 68.

A bevel pinion 69 fast upon the steering shaft 70 actuates the rudder 54, said shaft 70 having a gear 71 fast thereupon adapted, when that shaft is moved longitudinally by the outward movement of the propeller and rudder, to mesh with a gear 72 fast upon the shaft 72$^a$ that is operatively connected to the steering post 8. In view of the foregoing it is obvious that the machine may be guided by means of the rudder 54 and steering wheel when in the water and by means of the steering wheel and front wheels in the usual manner when on land.

The front compartment of the vehicle is preferably provided with but one door 73 on the driver's side and the rear-seat compartment with one door 74 on the right hand side. These doors are so constructed and fitted to the body that in closed position they form water tight closures. Below each door, however, the exterior of the body is provided with a pair of hinged shields 75, 76 connected by a rod 77, the shield 75 being engaged by a cord 78 that passes through a perforation in the sides of the vehicle body and about guide sheaves 79 to and about a drum 80 and integral pulley 81 both loose upon a stub shaft 82 arranged beneath a seat of the vehicle, said cord then being connected to a rod 83 fast upon the pivotal shaft 84 fast upon the rock shaft 85 in the floor of the front compartment, said rock shaft being provided with a lever 86 fulcrumed thereupon for engagement with the teeth of the rack 87 arranged in the dash. When the shaft 85 is depressed the cord 78 is wound upon the drum 80 and the shields 75, 76 moved up flat against the vehicle body or a door thereof to positively retain the same firmly in closed position. When on land the lever 86 is released from the rack and the weight of the shields will cause them to move into position substantially at right angles to the vehicle body. The radiator 88 at the front of the vehicle is provided with shields 89 to protect it from the water when occasion demands.

What is claimed is:—

1. In a land and water vehicle, a body, wheels therefor capable of adjustment vertically of said body, a propeller housing formed in said body, a propeller movable into and out of said housing, a rudder movable with said propeller, and vehicle propelling mechanism for interchangeable engagement with said wheels and propeller.

2. In a land and water vehicle, a body, wheels therefor capable of adjustment relative to said body, a propeller housing formed in said body and having a grooved floor, a propeller adjustably supported in the grooved portion of said floor, a rudder movable with said propeller, and vehicle propelling mechanism for interchangeable engagement with said wheels and propeller.

3. In a land and water vehicle, a body, wheels therefor capable of adjustment vertically of said body, a propeller housing formed in said body, doors for said housing, a propeller movable into and out of said housing and operatively connected to said doors for opening and closing the same, a rudder movable with said propeller, and vehicle propelling means for interchangeable engagement with said wheels and propeller.

4. In a land and water vehicle, a body, racks adjustable vertically along the outer face of said body, wheels carried by said racks, a propeller housing forming a part of said body, a propeller for movement into and out of said housing, a rudder movable with said propeller, and vehicle propelling mechanism for interchangeable engagement with said wheels and propeller.

5. In a land and water vehicle, a body comprising a driver's compartment, wheels therefor capable of adjustment vertically of said body, a propeller movable into and out of operative position in said body, manually operable control mechanism for said wheels and propeller within said driver's compartment, and vehicle propelling mechanism for interchangeable engagement with said wheels and propeller.

6. In a land and water vehicle, a body, a drive shaft in the rear end of said body, connecting axles for said drive shaft, a floating bridge in said body operatively supporting said drive shaft and connecting axles, stub axles releasably connected to said connecting axles, blocks slidable in said body carrying said stub axles, adjustable racks arranged upon the sides of said body and integral with said blocks, wheels carried by said stub axles, and drive mechanism for said wheels in one position of the same.

7. In a land and water vehicle, a body, a drive shaft in the rear end of said body, auxiliary shafts in said body, connection between said drive shaft and auxiliary shafts, wheels releasably connected to said drive shaft, supporting means for said wheels adjustable vertically of said body, and actuating mechanism for said supporting means connecting the same and said auxiliary shafts.

8. In a land and water vehicle, a body, doors therefor, retaining bars for said doors hinged to said body and connected to each other, and manual control for said retaining bars in the driver's compartment of said body.

In testimony that I claim the foregoing as my own I have hereto affixed my signature.

ARTHUR JOHNSON.